Patented Mar. 10, 1942

2,275,835

UNITED STATES PATENT OFFICE 2,275,835

EXTRACTION OF THEOBROMINE

Clemens A. Balmert, Hackensack, and Russell D. Drinkard, Maywood, N. J., and Guy N. Harcourt, Buffalo, N. Y., assignors to Citro Chemical Co. of America, Maywood, N. J., a corporation of New Jersey No Drawing. Application October 3, 1940, Serial No. 359,564

14 Claims. (Cl. 260—256)

This invention relates to the extraction of theobromine from naturally occurring theobromine-containing products. More particularly, the invention relates to an improved process of the type wherein a naturally occurring theobromine-containing product of either the fat-containing or defatted type is mixed and agitated with water and an excess of an alkaline earth metal hydroxide with resulting solubilization and extraction of the theobromine.

The conventional process described and used heretofore for the extraction of theobromine from theobromine-containing products by means of an alkaline earth metal hydroxide and water comprises intimately mixing the dry theobromine-containing product and the alkaline earth metal hydroxide such, for example, as hydrated lime and subsequently agitating this mixture with a large excess of water. The hydrated lime solubilizes the theobromine apparently by forming the water-soluble calcium salt of theobromine and the solubilized theobromine is thus extracted by the water. The large excess of water is necessary in order to obtain a satisfactorily quantitative extraction of the solubilized theobromine. The resulting aqueous mixture is then filtered to separate the extracted theobromine from insoluble fibrous matter, and theobromine is recovered from the filtrate by substantial evaporation of water from the filtrate and by allowing the theobromine to crystallize therefrom. Commercially satisfactory operation in accordance with this process generally requires a further extraction of the filter cake with an additional quantity of hydrated lime and water in order to obtain an overall theobromine recovery of commercial significance. The use of a large excess of water in such an extraction operation requires the application of a large quantity of heat, usually in the form of steam, for evaporation of the theobromine-containing filtrate to an extent necessary for satisfactory crystallization of theobromine therefrom.

We have devised an improved process for the extraction of theobromine with an alkaline earth metal hydroxide whereby the total amount of water used in this extraction is substantially less than that required heretofore and whereby the filter cake from a single extraction operation can be discarded without loss of an appreciable quantity of unextracted theobromine remaining therein. The improvement of our invention comprises agitating the theobromine-containing product with an aqueous medium containing a substantial excess of alkaline earth metal hydroxide, the quantity of aqueous medium being such as to produce a thin paste-like mixture of said product and the alkaline earth metal hydroxide, filtering the paste-like mixture under pressure with the separation of a filtrate and a filter cake, displacing substantially the remaining theobromine content of the product from the filter cake by leaching the filter cake with water, and recovering theobromine from this filtrate and the wash-water obtained from the leaching operation. We have found that the total amount of water used in making up the thin paste-like mixture of the theobromine-containing product and the alkaline metal hydroxide and of water required to displace the remaining theobromine content of the product from the filter cake amounts to about 50% or less of the total amount of water required in the conventional process outlined hereinabove. An exceptionally high yield of theobromine is thus obtained from the theobromine-containing product in a single treatment without using elevated temperatures in excess of about 70° C., thus avoiding the substantial decomposition of theobromine and the production of a slimy product which hinders filtration as is the case in extraction operations conducted at elevated temperatures upwards of about 70° C.

In accordance with our improved process, the theobromine-containing product is mixed and agitated with an aqueous medium containing the alkaline earth metal hydroxide. This operation eliminates the additional step heretofore required of intimately mixing the theobromine-containing product and the alkaline earth metal hydroxide in the dry state and thereby eliminates the need of dry-mixing apparatus. We have found it advisable to add the theobromine-containing product to the aqueous medium containing the alkaline earth metal hydroxide because if the theobromine-containing product, such as cocoa waste, is first mixed alone with the same quantity of water used in making up the thin paste-like mixture in accordance with our process the fatty nature of the theobromine-containing product causes the mixture of this product and water to form a lumpy, non-homogeneous aggregate. We have found, however, that the dry theobromine-containing product may be added, with simultaneous agitation, to an aqueous mixture containing the alkaline earth metal hydroxide with the resulting production of a smooth paste-like mixture.

The amount of aqueous medium, which may be either water or a final wash filtrate from a preceding batch operation as hereinafter described, or both, should be such as to produce a thin paste-like mixture of the theobromine-containing product and the alkaline earth metal hydroxide. The amount of alkaline earth metal hydroxide, such as hydrated lime, used in accordance with our process should be substantially in excess of that required theoretically to combine with the theobromine content of the theobromine-containing product. In general we have found that about 25% to about 50% of hydrated lime by weight of the theobromine-containing product may be used with advantage. Particularly effective results are obtained within this range by the use of about 40% by weight of hydrated lime, and when using this amount of hydrated lime we have found that about 350% of water by weight of the theobromine-containing product will produce a paste-like mixture of the desired consistency.

We have found that a highly satisfactory extraction may be effected by agitating the mixture of theobromine-containing product and the alkaline earth metal hydroxide for a period of about five to fifteen minutes. A longer period of agitation appears not to increase the quantitative extraction of the theobromine, and prolonged agitation greatly in excess of this period (say, one hour or more) results in the production of a slimy material in the paste-like mixture which greatly retards and impairs the rate at which the mixture can be filtered.

The thin paste-like mixture of theobromine-containing product and alkaline earth metal hydroxide is then pumped under a suitable pressure into a washing-type filter press (plate and frame type) so that the whole press is completely filled. The filtrate thus obtained contains an appreciable proportion of the theobromine content of the theobromine-containing product. The filter cake is then leached with a suitable volume of water at a temperature ranging between room temperature and about 60° C., or slightly higher. The volume of water which may be used with advantage for this leaching operation is substantially twice the volume, or somewhat more, of the water used in making up the thin paste-like mixture of the theobromine-containing product an the alkaline earth metal hydroxide. Leaching of theobromine-containing products of the defatted type may be effectively carried out with washing water at either room temperature or at elevated temperatures up to about 60° C., but fat-containing products are more resistant to leaching and require leaching with water at an elevated temperature (say in the neighborhood of 60° C.) in order to obtain a high yield of theobromine from such products. The wash-water obtained from this leaching operation is combined with the first filtrate for subsequent recovery of theobromine therefrom. The filter cake may be finally washed with an additional quantity of water in amount such as to be used as the aqueous medium in working up another paste-like mixture of fresh theobromine-containing product and alkaline earth metal hydroxide. The washed filter cake may then be discarded inasmuch as substantially the entire theobromine content of the theobromine-containing product is contained in the first filtrate and in the wash-water combined therewith.

The theobromine-containing solution, comprising the combined filtrate and wash-water, is then treated in accordance with one of the following two methods for the recovery of theobromine therefrom. In accordance with the first of these two methods, the theobromine-containing solution is evaporated to about one-twentieth or one-thirtieth its volume by heating the solution under a pressure substantially below 760 mm. pressure (i. e. below standard atmospheric pressure at sea level). The sub-atmospheric pressure aids evaporation of water from the solution and also permits evaporation at a reduced temperature, that is, below about 170° F., thereby minimizing decomposition of theobromine concomitant with the use of higher temperatures. The concentrated solution is then preferably cooled to about room temperature and is acidified with a suitable acid, such as hydrochloric acid, to a pH of about 5.8 to about 6.2. The acidification serves to convert the solubilized theobromine, apparently in the form of the soluble calcium salt of theobromine, into the crystallizable alkaloid, theobromine. The acidification also assists in minimizing the undesirable effect of any slimy products produced during the evaporation step, and we have discovered that it is highly advantageous to boil the acidified concentrated solution for about fifteen minutes in order further to reduce the amount of slimy products which otherwise would impair the subsequent filtering operation. We have found that by adding a relatively small amount (say a fraction of 1% by weight) of sodium hydrosulphite or sodium sulphoxylate-formaldehyde to the cool, acidified, concentrated solution we can markedly facilitate and promote precipitation of the theobromine during subsequent crystallization. The resulting solution is allowed to stand for about one hour with precipitation of crystallized theobromine which is subsequently removed by filtration. This precipitate contains about 70 to 80% of the total theobromine content of the theobromine-containing product.

The mother liquor from the last filtration is then extracted at a temperature of about 80° to 100° C. in a suitable extractor using tetrachlorethane as the solvent. This solvent removes the major portion of theobromine remaining in the mother liquor and also removes the small amount of native caffeine extracted from the theobromine-containing product. Two or three additional extracts are similarly made from the mother liquor, and the extracts from each of these three or four extractions are combined and steam distilled to remove the solvent (tetrachlorethane) and to leave the theobromine and caffeine in the aqueous phase. Theobromine is recovered from this aqueous phase by further evaporation of the aqueous phase to a small volume with resulting precipitation of crystallized theobromine. The caffeine is then removed from the remaining aqueous solution by a subsequent extraction with a suitable solvent such as benzol or trichlorethylene.

The second of these two methods of recovering theobromine from the theobromine-containing solution comprises reducing the solution to about one-sixth its volume by heating the solution at an elevated temperature below about 170° F. while maintained under a pressure below about 760 mm. as described hereinabove for the first method of recovering the theobromine. The concentrated solution is then cooled with advantage to room temperature and is acidified to a pH of about 5.8 to about 6.2. The acidification may be followed advantageously with a subsequent heating operation for about fifteen minutes to convert the slimy substances contained in the solution into an easily filterable material thus facilitating subsequent filtration. A small amount of sodium hydrosulphite or sodium sulphoxylate-formaldehyde is then added to the concentrated acidified solution for the purpose described hereinbefore and the solution is allowed to stand for about one hour whereupon precipitated crystals of theobromine are removed by filtration. The mother liquor from this filtration is further evaporated to about one-fourth its volume by heating under a partial vacuum and is subsequently cooled to obtain a second crop of crystallized theobromine. The last mother liquor from the second crop of theobromine is finally extracted with tetrachlorethane in the same manner as described in connection with the preceding method of treating the theobromine-containing solution.

The following specific example will serve to illustrate the improved process of our invention. About 170 liters of the final wash-water from a previous extraction was charged into a suitable vessel at room temperature. About 40 pounds of hydrated lime was then added slowly with agitation over a period of about five minutes. To this mixture, 100 pounds of a theobromine-containing fatty cocoa waste product was added slowly with simultaneous agitation over a period of about five minutes. The resulting thin paste-like mixture was pumped into a conventional reverse-washing type plate and frame filter press until the entire press was filled with a filter cake at which time a back-pressure of about 35 pounds per square inch was developed. About 30 liters of water at room temperature was further used to wash out the paste-like mixture from the lines and the pump into the filter. The filter cake was then reverse-washed with 367 liters of water at a temperature of about 60° C. to leach the filter cake and the wash-water thus obtained was combined with the filtrate from the thin paste-like mixture. The filter cake was finally washed with about 170 liters of water and this final wash-water was used in making up the thin paste-like mixture in the next extraction of a fresh quantity of theobromine-containing cocoa product with hydrated lime.

The theobromine-containing solution, comprising the combined filtrate and wash-water, was treated in accordance with the first method described hereinabove for the recovery of theobromine therefrom. The solution was evaporated, by steam heating, under a partial vacuum of about 27–28 inches of mercury to from about one-twentieth to about one-thirtieth of its volume. The concentrated solution was then cooled to about room temperature and acidified with hydrochloric acid, while stirring, sufficient in amount to give the concentrated solution a pH value of 6.0. The acidified solution was boiled for about 15 minutes to facilitate subsequent filtration and was then cooled. A fraction of 1% by weight of sodium hydrosulphite was added to the resulting solution. Upon standing for about one hour theobromine crystals were precipitated and were separated from the mother liquor by filtration. The mother liquor was then extracted three times with about one-third its volume of tetrachlorethane in each extraction at a temperature between 80°–100° C. The extracts from these three extractions were combined and were steam distilled to remove the tetrachlorethane and to leave the theobromine and native caffeine in the aqueous phase. Theobromine was recovered from this aqueous phase by evaporation thereof to a smaller volume and by filtration of the resulting theobromine crystals precipitated from the mother liquor after cooling and standing for a short period of time. Finally, the caffeine was removed from the resulting mother liquor by extraction of this small volume of the aqueous phase with trichlorethylene. The total recovery of theobromine represented an exceptionally high percentage of the theobromine originally contained in the cocoa waste product.

Numerous economies are obtained in accordance with the improved extraction process of our invention. The mixing and agitation of the theobromine-containing product with an excess of an alkaline earth metal hydroxide and an amount of an aqueous medium such as to produce a thin paste-like mixture and the subsequent separation of a filtrate in a filter press and leaching or displacement of the remaining theobromine from the filter cake effects such a high recovery of the theobromine from the theobromine-containing material as to permit discarding of the filter cake after a single treatment. The total amount of water required in accordance with our invention in making up the thin paste-like mixture and in displacing the remaining theobromine from the filter cake is a fraction of the total amount of water required in the conventional theobromine extraction processes for an equivalent quantitative extraction of theobromine from the theobromine-containing material. This reduced quantity of water required in accordance with our improved extraction process effects a substantial economy by markedly reducing the amount of heat required to concentrate the theobromine-containing solution obtained from the extraction operation. Furthermore, our general method of recovering theobromine from this theobromine-containing solution is highly efficient with resulting excellent quantitative recovery of theobromine therefrom.

As described hereinabove, it is particularly advantageous to form the paste-like mixture of theobromine-containing product, alkaline earth metal hydroxide and aqueous medium by admixing the theobromine-containing product with the aqueous medium containing the alkaline earth metal hydroxide. However, it must be understood that within the scope of our invention the theobromine-containing product and the alkaline earth metal hydroxide may be admixed in the dry state (or substantially dry state) or that the theobromine-containing product may be admixed first with the aqueous medium and the alkaline earth metal hydroxide then added to this mixture, although these latter methods are less desirable for reasons set forth hereinbefore. Regardless of the method of admixture, the mixture should contain an amount of the aqueous medium sufficient to give the mixture a paste-like consistency, the term "paste-like" being used herein and in the appended claims to mean a mixture which is substantially non-settling and capable of being pumped to the filter press. Filtration of this paste-like mixture "under pressure" in accordance with our invention includes the use of a positive, or superatmospheric, pressure as well as the use of a negative, or subatmospheric, pressure obtained for example by filtration with a vacuum-type filter such as an "Oliver" filter.

We claim:

1. In the process of extracting theobromine from a naturally occurring theobromine-containing product wherein the product is mixed and agitated with water and an excess of an alkaline earth metal hydroxide with resulting solubilization and extraction of the theobromine, the improvement which comprises agitating a mixture of the theobromine-containing product, a substantial excess of the alkaline earth metal hydroxide and an aqueous medium, the theobromine-containing product being brought into contact with the aqueous medium in the presence of the alkaline earth metal hydroxide and the quantity of aqueous medium being such as to produce a paste-like mixture filterable and substantially non-settling of said product and the alkaline earth metal hydroxide having substantially the consistency of a mixture of theobromine-containing material with about 40% hydrated lime and about 350% water by weight of the theobromine-containing material, filtering the paste-like mixture under pressure with the separation of a filtrate and a filter cake, and displacing substantially the remaining theobromine content of the product from the filter cake by leaching the filter cake in situ with about twice as much water as used in making up the paste-like mixture and at a temperature from about room temperature to about 60° C.

2. In the process of extracting theobromine from a naturally occurring theobromine-containing product wherein the product is mixed and agitated with water and an excess of an alkaline earth metal hydroxide with resulting solubilization and extraction of the theobromine, the improvement which comprises agitating a mixture of the theobromine-containing product, about 25% to about 50% of the alkaline earth metal hydroxide and about 350% of an aqueous medium by weight of the theobromine-containing product, the theobromine-containing product being brought into contact with the aqueous medium in the presence of the alkaline earth metal hydroxide, whereby a thin paste-like filterable and substantially non-settling mixture of said product and the alkaline earth metal hydroxide is obtained having substantially the consistency of a mixture of theobromine-containing material with about 40% hydrated lime and about 350% water by weight of the theobromine-containing material, filtering the paste-like mixture under pressure with the separation of a filtrate and a filter cake, and displacing substantially the remaining theobromine content of the product from the filter cake by leaching the filter cake in situ with about twice as much water as used in making up the paste-like mixture and at a temperature from about room temperature to about 60° C.

3. In the process of extracting theobromine from a naturally occurring theobromine-containing product wherein the product is mixed and agitated with water and an excess of an alkaline earth metal hydroxide with resulting solubilization and extraction of the theobromine, the improvement which comprises agitating a mixture of the theobromine-containing product, a substantial excess of the alkaline earth metal hydroxide and an aqueous medium at a temperature ranging from about 25° C. to about 60° C., the theobromine-containing product being brought into contact with the aqueous medium in the presence of the alkaline earth metal hydroxide and the quantity of aqueous medium being such as to produce a thin paste-like filterable and substantially non-settling mixture of said product and the alkaline earth metal hydroxide having substantially the consistency of a mixture of theobromine-containing material with about 40% hydrated lime and about 350% water by weight of the theobromine-containing material, filtering the paste-like mixture under pressure with the separation of a filtrate and a filter cake, and displacing substantially the remaining theobromine content of the product from the filter cake by leaching the filter cake in situ with about twice as much water as used in making up the paste-like mixture and at a temperature ranging from about 25° C. to about 60° C.

4. In the process of extracting theobromine from a naturally occurring theobromine-containing product wherein the product is mixed and agitated with water and an excess of an alkaline earth metal hydroxide with resulting solubilization and extraction of the theobromine, the improvement which comprises adding the theobromine-containing product with simultaneous agitation for a period of time not substantially in excess of about ten minutes to an aqueous medium containing a substantial excess of the alkaline earth metal hydroxide, the quantity of aqueous medium being such as to produce a thin paste-like filterable and substantially non-settling mixture of said product and the alkaline earth metal hydroxide having substantially the consistency of a mixture of theobromine-containing material with about 40% hydrated lime and about 350% water by weight of the theobromine-containing material, filtering the paste-like mixture under pressure with the separation of a filtrate and a filter cake, displacing substantially the remaining theobromine content of the product from the filter cake by leaching the filter cake in situ with about twice as much water as used in making up the paste-like mixture and at a temperature from about room temperature to about 60° C., and recovering theobromine from said filtrate and the wash-water obtained from the leaching operation.

5. In the process of extracting theobromine from a naturally occurring theobromine-containing product wherein the product is mixed and agitated with water and an excess of an alkaline earth metal hydroxide with resulting solubilization and extraction of the theobromine, the improvement which comprises agitating a mixture of the theobromine-containing product, a substantial excess of the alkaline earth metal hydroxide and an aqueous medium, the theobromine-containing product being brought into contact with the aqueous medium in the presence of the alkaline earth metal hydroxide and the quantity of aqueous medium being such as to produce a thin paste-like mixture filterable and substantially non-settling of said product and the alkaline earth metal hydroxide having substantially the consistency of a mixture of theobromine-containing material with about 40% hydrated lime and about 350% water by weight of the theobromine-containing material, filtering the paste-like filterable and substantially non-settling mixture under pressure with the separation of a filtrate and a filter cake, displacing substantially the remaining theobromine content of the product from the filter cake by leaching the filter cake in situ with about twice as much water as used in making the up the paste-like mixture and at a temperature from about room temperature to about 60° C., and recovering theobromine from said filtrate and the wash-water obtained from the leaching operation by evaporating under a pressure substantially below 760 mm. a substantial portion of the water from said filtrate and wash-water, acidifying the resulting concentrated product to a pH of about 5.8–6.2, and removing theobromine from the acidified concentrated product by crystallization of the theobromine therefrom.

6. In the process of extracting theobromine from a naturally occurring theobromine-containing product wherein the product is mixed and agitated with water and an excess of an alkaline earth metal hydroxide with resulting solubilization and extraction of the theobromine, the improvement which comprises agitating a mixture of the theobromine-containing product, a substantial excess of the alkaline earth metal hydroxide and an aqueous medium, the quantity of aqueous medium being such as to produce a thin paste-like mixture of said product and the alkaline earth metal hydroxide, filtering the paste-like mixture under pressure with the separation of a filtrate and a filter cake, displacing substantially the remaining theobromine content of the product from the filter cake by leaching the filter cake with water, and recovering theobromine from said filtrate and the wash-water obtained from the leaching operation by evaporating a substantial portion of the water from said filtrate and wash-water, acidifying the resulting concentrated product to a pH of about 5.8–6.2, boiling the acidified concentrated product for a short period of time, and removing theobromine from the acidified concentrated product by crystallization of the theobromine therefrom.

7. In the extraction of theobromine from a naturally occurring theobromine-containing product wherein the theobromine is separated in the form of an alkaline solution and wherein the alkaline solution is acidified to liberate the theobromine with the resulting production of a difficultly filterable mass, the improvement which comprises boiling the acidified solution for a short period of time, whereby a readily filterable mass is obtained.

8. In the extraction of theobromine from a naturally occurring theobromine-containing product wherein the theobromine is separated in the form of an alkaline solution and wherein the alkaline solution is acidified to liberate the theobromine with the resulting production of a difficultly filterable mass, the improvement which comprises boiling the acidified solution for about fifteen minutes, whereby a readily filterable mass is obtained.

9. In the process of extracting theobromine from a naturally occurring theobromine-containing product wherein the product is mixed and agitated with water and an excess of an alkaline earth metal hydroxide with resulting solubilization and extraction of the theobromine, the improvement which comprises agitating the theobromine-containing product, a substantial excess of the alkaline earth metal hydroxide and an aqueous medium, the quantity of aqueous medium being such as to produce a thin paste-like mixture of said product and the alkaline earth metal hydroxide, filtering the paste-like mixture under pressure with the separation of a filtrate and a filter cake, displacing substantially the remaining theobromine content of the product from the filter cake by leaching the filter cake with water, and recovering theobromine from said filtrate and the wash-water obtained from the leaching operation by evaporating a substantial portion of the water from said filtrate and wash-water, acidifying the resulting concentrated product to a pH of about 5.8–6.2, incorporating in the acidified concentrated product a relatively small amount of a compound selected from the group consisting of sodium hydrosulphite and sodium sulphoxylate-formaldehyde, and removing theobromine from the acidified concentrated product by crystallization of the theobromine therefrom.

10. In the process of extracting theobromine from a naturally occurring theobromine-containing product wherein the product is mixed and agitated with water and an excess of an alkaline earth metal hydroxide with resulting solubilization and extraction of the theobromine, the improvement which comprises agitating the theobromine-containing product, a substantial excess of the alkaline earth metal hydroxide and an aqueous medium, the quantity of aqueous medium being such as to produce a thin paste-like mixture of said product and the alkaline earth metal hydroxide, filtering the paste-like mixture under pressure with the separation of a filtrate and a filter cake, displacing substantially the remaining theobromine content of the product from the filter cake by leaching the filter cake with water, and recovering theobromine from said filtrate and the wash-water obtained from the leaching operation by evaporating a substantial portion of the water from said filtrate and wash-water, acidifying the resulting concentrated product to a pH of about 5.8–6.2, incorporating in the acidified concentrated product a relatively small amount of sodium hydrosulphite, and removing theobromine from the acidified concentrated product by crystallization of the theobromine therefrom.

11. In the recovery of theobromine from an acidified concentrated solution containing the theobromine, the improvement which comprises incorporating in the solution a relatively small amount of a compound selected from the group consisting of sodium hydrosulphite and sodium sulphoxylate-formaldehyde, whereby crystallization of theobromine from the solution is markedly facilitated and promoted.

12. In the recovery of theobromine from an acidified concentrated solution containing the theobromine, the improvement which comprises incorporating in the solution a relatively small amount of sodium hydrosulphite, whereby crystallization of theobromine from the solution is markedly facilitated and promoted.

13. In the recovery of theobromine from an acidified concentrated solution containing the theobromine, the improvement which comprises incorporating in the solution a fraction of one percent by weight of sodium hydrosulphite, whereby crystallization of theobromine from the solution is markedly facilitated and promoted.

14. In the process of extracting theobromine from a naturally occurring theobromine-containing product wherein the product is mixed and agitated with water and an excess of an alkaline earth metal hydroxide with resulting solubilization and extraction of the theobromine, the improvement which comprises agitating a mixture of the theobromine-containing product, a substantial excess of the alkaline earth metal hydroxide and an aqueous medium, the quantity of aqueous medium being such as to produce a paste-like mixture of said product and the alkaline earth metal hydroxide, filtering the paste-like mixture under pressure with the separation of a filtrate and a filter cake, displacing substantially the remaining theobromine content of the product from the filter cake by leaching the filter cake with water, and recovering theobromine from said filtrate and the wash-water obtained from the leaching operation by evaporating a substantial portion of the water from said filtrate and wash-water, acidifying the resulting concentrated product to a pH of about 5.8–6.2, boiling the acidified concentrated product for a short period of time, cooling the resulting product, and incorporating in the cooled product a relatively small amount of a compound selected from the group consisting of sodium hydrosulphite and sodium sulphoxylate-formaldehyde, and removing theobromine from the acidified concentrated product by crystallization of the theobromine therefrom.

CLEMENS A. BALMERT.
RUSSELL D. DRINKARD.
GUY N. HARCOURT.

CERTIFICATE OF CORRECTION.

Patent No. 2,275,835.  March 10, 1942.

CLEMENS A. BALMERT, ET AL.

It is hereby certified that error appears in the printed specification of the above numbered patent requiring correction as follows: Page 2, first column, line 49, for "an" read --and--; page 4, first column, line 13, claim 1, strike out the word "mixture" and insert the same after "non-settling" in line 14, same claim; and second column, line 58, claim 5, strike out "mixture" and insert the same after "non-settling" in line 59, same claim; lines 65 and 66, strike out "filterable and substantially non-settling"; line 71, same claim 5, strike out "the" after --making--; and that the said Letters Patent should be read with this correction therein that the same may conform to the record of the case in the Patent Office.

Signed and sealed this 28th day of April, A. D. 1942.

Henry Van Arsdale,
Acting Commissioner of Patents.

(Seal)